(12) United States Patent
Prokhorov

(10) Patent No.: US 8,463,721 B2
(45) Date of Patent: Jun. 11, 2013

(54) SYSTEMS AND METHODS FOR RECOGNIZING EVENTS

(75) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 341 days.

(21) Appl. No.: 12/851,207

(22) Filed: Aug. 5, 2010

(65) Prior Publication Data

US 2012/0036097 A1 Feb. 9, 2012

(51) Int. Cl.
*G06N 3/02* (2006.01)

(52) U.S. Cl.
USPC .......................................................... 706/20

(58) Field of Classification Search
USPC .................................... 706/20; 382/104, 224
See application file for complete search history.

(56) References Cited

U.S. PATENT DOCUMENTS

| | | | |
|---|---|---|---|
| 5,513,098 A | 4/1996 | Spall et al. | |
| 5,956,702 A | 9/1999 | Matsuoka et al. | |
| 7,321,895 B2 | 1/2008 | Dettinger et al. | |
| 2004/0024773 A1 | 2/2004 | Stoffel et al. | |
| 2007/0208497 A1 | 9/2007 | Downs et al. | |
| 2008/0082564 A1 | 4/2008 | Dettinger et al. | |
| 2008/0133468 A1 | 6/2008 | Dettinger et al. | |
| 2008/0144944 A1* | 6/2008 | Breed | 382/224 |
| 2009/0138187 A1 | 5/2009 | Mathias | |
| 2009/0290800 A1 | 11/2009 | Lo | |
| 2009/0299929 A1 | 12/2009 | Kozma et al. | |

* cited by examiner

*Primary Examiner* — Jeffrey A Gaffin
*Assistant Examiner* — Ola Olude Afolabi
(74) *Attorney, Agent, or Firm* — Dinsmore & Shohl LLP

(57) ABSTRACT

Systems and methods for recognizing events include a processor for executing machine readable instructions. The processor may be electronically coupled to an electronic memory. A temporal sensor may be electronically coupled to the processor for generating a sequence of temporal signals relating to an unrecognized event. The temporal sensor may transmit the sequence of temporal signals to the processor. The processor may execute the machine readable instructions to: input the sequence of temporal signals relating to the unrecognized event to a recurrent neural network; transform the sequence of temporal signals relating to the unrecognized event to a neural output relating to the unrecognized event with the recurrent neural network; input the neural output relating to the unrecognized event into a random forest classifier; and recognize a recognized event based upon a transformation of the neural output relating to the unrecognized event with the random forest classifier.

18 Claims, 6 Drawing Sheets

SYSTEMS AND METHODS FOR RECOGNIZING EVENTS

TECHNICAL FIELD

The present specification generally relates to systems and methods for machine learning and, more specifically, systems and methods for event recognition.

BACKGROUND

Event recognition systems generally implement algorithms developed from machine learning research. One branch of machine learning research is directed towards automatically recognizing and classifying data patterns. Once data is recognized and classified by a machine learning algorithm running on a computing device, the machine may make decisions based on the data patterns. For example, the data patterns may be a sequence of temporal data such as human speech. Human speech is commonly observed as a temporal sequence of sounds, i.e. in order to comprehend a sentence one commonly observes all of the audible syllables over time in the order they are uttered. A sensor may observe the speech over a time period and an algorithm may then process the speech to a machine recognizable state. Once the speech is recognized, the machine may then take action that corresponds to the speech. A further example includes the recognition and classification of temporal human behavior such as gestures, sign language, walking, jumping and other human activities.

Various techniques are utilized for event recognition related to temporal sequence recognition. Specifically, graphical models such as, for example, Hidden Markov Models and Conditional Random Fields may be utilized in temporal sequence recognition. Although these graphical models have been successful in recognizing temporal sequences, they are sensitive to training parameters and require a large amount of data and processing power to recognize complex temporal sequences.

Accordingly, a need exists for alternative systems and methods for event recognition, such as temporal sequence recognition.

SUMMARY

In one embodiment, a system for recognizing events may include a processor for executing machine readable instructions. The processor may be electronically coupled to an electronic memory. A temporal sensor may be electronically coupled to the processor for generating a sequence of temporal signals relating to an unrecognized event. The temporal sensor may transmit the sequence of temporal signals to the processor. The processor may execute the machine readable instructions to: input the sequence of temporal signals relating to the unrecognized event to a recurrent neural network; transform the sequence of temporal signals relating to the unrecognized event to a neural output relating to the unrecognized event with the recurrent neural network; input the neural output relating to the unrecognized event into a random forest classifier; and recognize a recognized event based upon a transformation of the neural output relating to the unrecognized event with the random forest classifier.

In another embodiment, a method for recognizing events, wherein a temporal sequence of electronic data may be transformed by a processor into a sequence recognition, may include: inputting a sequence of temporal signals relating to an unrecognized event into a feedback system, wherein the feedback system comprises a hidden layer of nodes for performing intermediate transformations; generating a feature vector relating to the unrecognized event from the sequence of temporal signals with the hidden layer of nodes, the feature vector representing a plurality of intermediate transformations of the sequence of temporal signals; inputting the feature vector into an ensemble classifier for the sequence recognition; recognizing a recognized event based upon a plurality of classifying transformations performed by the ensemble classifier upon the feature vector relating to the unrecognized event; and providing output relating to the recognized event.

In yet another embodiment, a method for recognizing events, wherein a temporal sequence of electronic data may be transformed by a processor into a sequence recognition, may include: inputting a sequence of temporal signals relating to an unrecognized event into a group of classifiers, wherein each of the group of classifiers includes decision nodes for making determinations based upon the sequence of temporal signals, decision paths that interconnect the decision nodes, and filtering functions that transforms the sequence of temporal signals; assigning the filtering functions to each of the decision nodes, wherein one of the decision nodes is assigned a recurrent neural network; transforming the sequence of temporal signals relating to the unrecognized event at the decision nodes to a windowed sequence relating to the unrecognized event; following each of the decision paths based at least in part upon a transformation of the windowed sequence by the filtering functions; generating a group of sub-recognition events by following the decision paths of the group of classifiers until they terminate; and recognizing a recognized event based upon the group of sub-recognition events.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As used herein with the various illustrated embodiments described below, the following terms include, but are not limited to, the following meanings.

The phrase "electronically coupled" means that components are capable of transmitting data signals with one another such as for example, electrical signals via conductive medium, electromagnetic signals via air, optical signals via optical waveguides, and the like.

The phrase "ensemble classifier" means a combination of individual classifiers that are combined together to form a single classifier.

The term "classifier" means an algorithm that groups items based on information inherent in the items such as support vector machines, k-nearest neighbors, Gaussian mixture models, Gaussians, decision trees and their equivalents.

The phrase "sub-recognition event" means an output from a single classifier of an ensemble classifier.

The phrase "unsupervised learning algorithm" means a class of solution algorithms that solve problems relating to data organization such as self-organizing map, adaptive resonance theory, and their equivalents.

The phrase "evolutionary algorithm" means a class of optimizers that models candidate solutions to as individuals in a population with a fitness function that determines the appropriateness of a candidate solution such as genetic algorithms and their equivalents.

The phrase "randomizer" means an algorithm that simulates random activity by modeling a discrete or continuous probability distribution function such as, for example, a Gaussian, uniform distribution, or any other known distribution.

The phrase "multi-dimensional signal" means a signal indicative of data having N-dimensions, where N is a positive integer such as, for example, an image, a brainwave, an electroencephalograph (EEG), and any other signal detected from an array of sensors.

As illustrated in the figures, systems and methods for recognizing events generally comprise a temporal sensor for generating a sequence of temporal signals relating to an unrecognized event, and machine readable instructions for transforming the sequence of temporal signals relating to an unrecognized event to a recognized event. Various embodiments of systems and methods for event recognition will be described in more detail herein.

Figure 1:
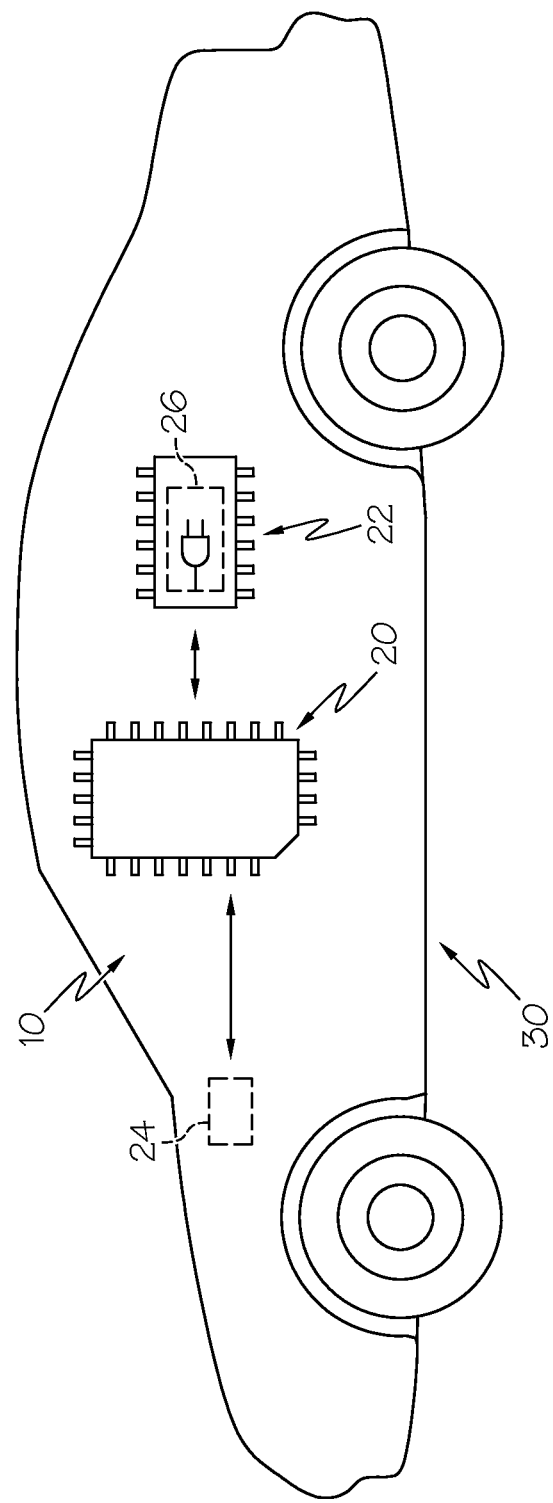
FIG. 1 schematically depicts a system for recognizing events according to one or more embodiments shown and described herein.

Referring now to FIG. 1, one embodiment of a system 10 for recognizing events comprises a processor 20 for executing machine readable instructions 26. The processor 20 is electronically coupled (generally indicated in FIG. 1 by a double arrowed line) to an electronic memory 22. A temporal sensor 24 is electronically coupled to the processor 20 and positioned to observe a temporal sequence such as, for example, on a vehicle 30.

Still referring to FIG. 1, the processor 20 executes machine readable instructions 26 to recognize an event based on a sequence of temporal signals. The processor 20 may be an integrated circuit, a microchip, a computer, an application-specific integrated circuit (ASIC), a field programmable gate array (FPGA), or any other computing device capable of executing machine readable instructions. The electronic memory 22 may be RAM, DRAM, SDRAM, ROM, a flash memory, a static memory, or any device capable of storing machine readable instructions. In the embodiments described herein, the processor 20 and the electronic memory 22 are discrete components electronically coupled to one another. However, it is noted that the processor 20 and the electronic memory 22 may be integral with one another without departing from the scope of the present disclosure.

The temporal sensor 24 is a device that measures a physical quantity and converts it into an electrical signal which is correlated with the measured value of the physical quantity. Specifically, the temporal sensor 24 can generate a sequence of temporal signals relating to an unrecognized event and transmit the sequence of temporal signals to the processor 20 and/or electronic memory 22. For example, the temporal sensor 24 may be a camera, an accelerometer, a pressure sensor, a microphone, or any other sensor that can be coupled to a vehicle. In one embodiment, the temporal sensor 24 generates a sequence of temporal signals indicative of a driver's use of the steering wheel of the vehicle over a time period. Additionally, it is noted that the temporal sensors described herein are not limited to sensors that directly observe a physical quantity, i.e., the temporal sensor 24 may sense the input or output of electronic devices to generate a sequence of temporal signals.

The machine readable instructions 26 are stored within the electronic memory 22, and comprise logic or an algorithm for transforming a sequence of temporal signals relating to an unrecognized event to a recognized event. The machine readable instructions 26 can include groups of binary values which a processor executes to transform to a computing state from a preceding computing state. The transformations follow an ordered sequence of state changes in order to implement logic or an algorithm. The logic or algorithm may be written in a high-level language that is compiled into the machine readable instructions 26 such as programming languages of any generation (e.g., 2GL, 3GL, 4GL, or 5GL), scripting languages, microcode, an FPGA configuration, and their equivalents. Alternatively, the logic or algorithm may be written in an assembly language that is assembled into the machine readable instructions 26 via an assembler.

In one embodiment, the machine readable instructions 26 comprise a feedback system such as a recurrent neural network (RNN) and an ensemble classifier such as a random forest (RF) classifier, each of which will be discussed in greater detail herein. RNN's can be utilized to solve event recognition problems due to the relative ease with which they can be deployed to model complex relationships and their ability to retain a potentially arbitrarily long history of an input signal. The RNN can model a complex relationship between the inputs and outputs of a sequence of temporal signals with a plurality of nodes. For example, driver fatigue can be related to a sequence of multi-dimensional signals such as images of the driver's face sampled at a rate of one image per millisecond. The complex relationship between the driver's facial expression and the event of sleep may be difficult to model as a deterministic mathematical expression. The images of facial expressions may be input into an RNN and can be spread into various dimensions, e.g., split into groups of pixels. Each node performs a relatively simple data transformation on a single dimension, i.e., an activation function, such as a hyperbolic tangent, as compared to modeling the entire relationship. The activation function may take on a various forms including, without limitation, linear functions, step functions, ramp functions, sigmoid functions and Gaussian functions.

The RNN's ability to retain a history of an input signal comes from the arrangement of the dependencies between the nodes that perform the activation functions. The nodes may be arranged in a feed forward manner where the output of an earlier layer is the input for the subsequent layer. Thus, each layer of nodes may be dependent from the previous layer of nodes. The nodes may also be recurrent, i.e, dependent from the input of output of any of the nodes from an earlier portion of a temporal sequence. Therefore, an output of the RNN can be dependent upon the output of a plurality of interconnected nodes rather than a single transformation. For example, the recognition of a sleep event may be dependent upon pixels in a region around the eyes of the driver of the most recent image and pixels in a region around the forehead of a driver from an image from 5 seconds prior to the most recent image.

The process of organizing the interconnections between the nodes that perform relatively simple transformations is commonly called training Once the nodes are organized and properly trained the RNN can solve a complex problem with a composition of transformations performed in a sequence defined by the structure of the nodes. The RNN may be trained using an optimizer, an unsupervised learning algorithm, an evolutionary algorithm, and the like on a training sequence that comprises inputs and the correlated outputs. For example, the RNN may be trained using a time sequence of images of a driver falling asleep while driving. An unsupervised or an evolutionary algorithm may alter the RNN trainable parameters (also known as weights) until the RNN nodes exhibit sufficient behavioral differences between the normal driving and the sleepy driving based on the images of the driver falling asleep. Thus, an RNN may be utilized in systems and methods for event recognition by differentiation of RNN node behavior.

The systems and methods for event recognition described herein may also utilize an RF classifier. An RF classifier is an ensemble of decision trees that may be non-linear, fast, and flexible base learners that recognize events within a sequence of temporal signals. The sequence of temporal signals is input into the RF classifier and each tree within the forest may then generate a sub-recognition event. The recognized event can be recognized based upon majority voting of the group of sub-recognition events. For example, when a time sequence of images of a driver falling asleep while driving is input into an RF classifier, each tree decides whether the driver has fallen asleep. Whichever sleep state (e.g., awake or asleep) is recognized by the majority of trees is voted to be the recognized event.

In order to be deployed as an event recognizer, the constituent trees can be trained to recognize an event within a sequence of temporal signals that is correlated to the training sequence, i.e. once an RF classifier has been trained for sleep recognition, the RF classifier may be used to recognize sleep events in vehicles. RF classifiers can be trained (grown) in a manner that ensures that the errors made by individual trees are uncorrelated. Specifically, bootstrap sampling may be applied to generate training data for each individual tree by sampling both the data and the variables. Bootstrapping may be implemented by sampling a sampled sequence from a training sequence where unrecognized training events are correlated to a recognized training event, e.g., a time sequence of images of a driver falling asleep while driving. The sampled sequence and the training sequence may have an equal amount of data points where the sampled sequence is obtained by sampling with replacement from the training sequence. Many sampled sequences may be obtained from a single training sequence by duplicating a fraction of the data from the training sequence and leaving a fraction of the data (e.g., 30%) from the training sequence out of the sampled sequence. Bootstrapping operates to provide a more unbiased estimate of the tree performance.

A different subset may be sampled from the sampled sequence for each of the decision nodes within the individual tree while the tree is grown, i.e., the decision paths within the tree are trained. Each new node in a tree may be constructed based on a different sample of m variables. The best split (decision made at the decision node) among these m variables is chosen for the current decision node, in contrast to the typical decision tree construction, which selects the best split among all possible variables. For example, a first decision node may be trained with the first 5 seconds of a time sequence of images of a driver falling asleep, and the next decision node may be trained on different 5 second portion of the time sequence of images of a driver falling asleep. Training an RF classifier in this manner may ensure that the errors made by each tree of the forest are not correlated.

Figure 2A:
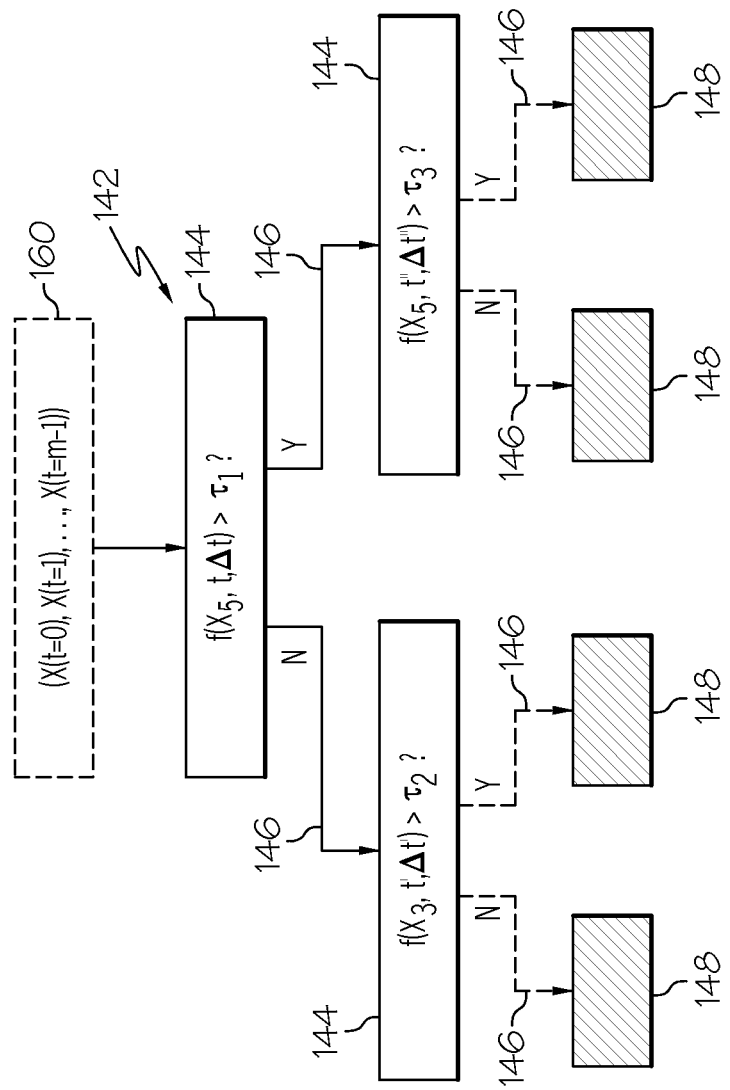
FIG. 2A schematically depicts a classifier according to one or more embodiments shown and described herein.

Another ensemble classifier that may be utilized to recognize events in a temporal sequence is a temporal random forest (TRF) which is a type of RF classifier that contains multiple temporal decision trees (TDT's). A TDT is an extension of a decision tree which may include temporal information at each node. Referring now to FIG. 2A, TDT generally comprises decision nodes 144 and decision paths 146 that interconnect a decision node 144 to a decision node 144 or a terminal leaf 148. As depicted in FIG. 2A, each decision node 144 comprises a filter $f$, denoted as $f(x_k, t, \Delta t)$, that is used to transform data prior to making a decision. A detailed example describing the training and testing of a TDT according to the embodiments described herein is provided below. However, it is noted, that the following example is provided for clarity and embodiments of the present disclosure are not limited thereby.

Figure 2B:
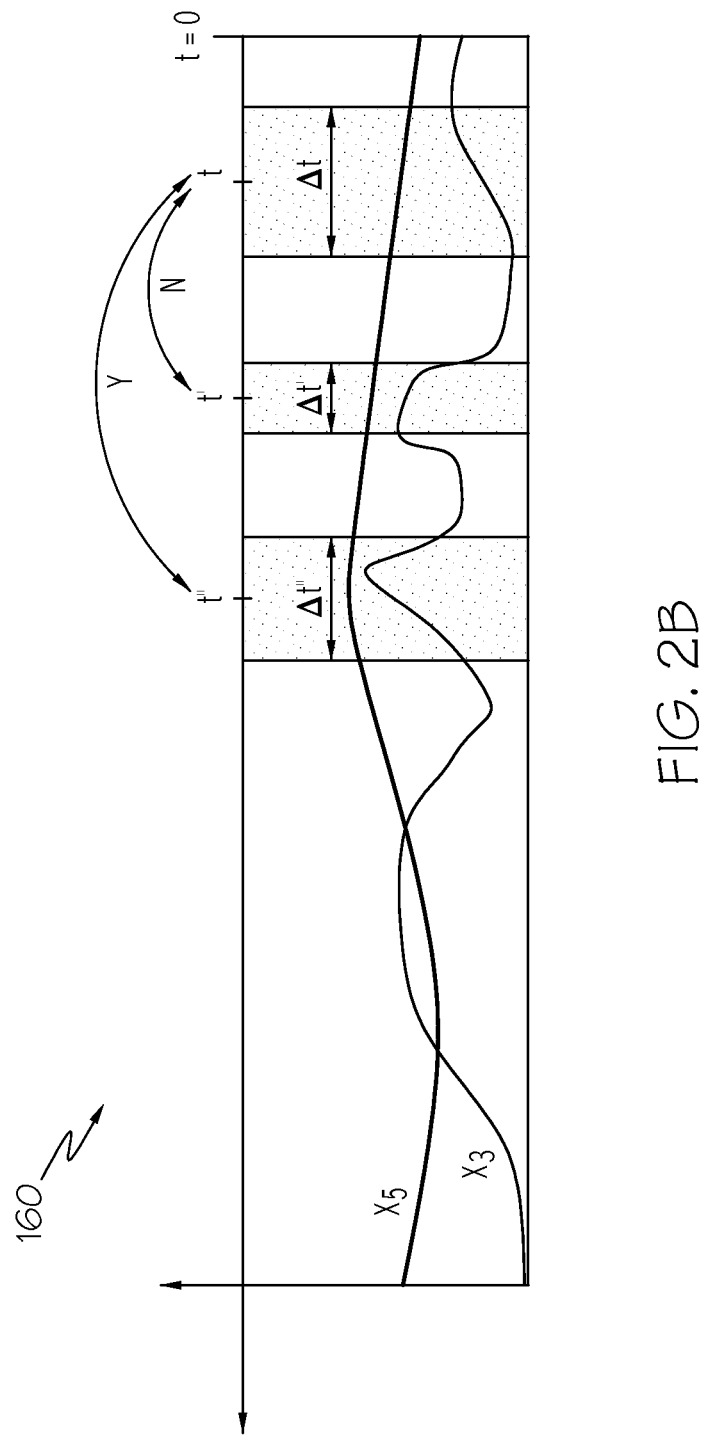
FIG. 2B graphically depicts a training sequence according to one or more embodiments shown and described herein.

Referring collectively to FIGS. 2A and 2B, each TDT may be trained with a different partition of a training sequence 160. The partition of temporal information at a decision node 144 of a classifier 142 is depicted in FIGS. 2A and 2B as a time window with a center t and a width $\Delta t$. Decisions at each decision node are made based upon the output of a filter $f$ (e.g., mean or slope of signal) applied to a specific temporal variable $x_k$ over a time window (t, $\Delta t$), as opposed to the entire sequence X.

The training process may involve training a forest of TDT's in a manner that is analogous to training a random forest as described herein. Each TDT may be trained as follows:

Random Set and Test Selection a) If the number of cases in the training set is N, sample N cases with a randomizer with replacement from the original data.

b) This sample will be the training set for training the tree. If there are M input variables, a number m<<M is specified such that at each node, m variables are selected by a randomizer, and the best split on these m is used to split the node.

c) The value of m is held constant during the forest training

Node Construction a) At such node a window (t, $\Delta t$), and a variable $x_k$ are chosen by a randomizer.

b) A filter $f(x_k, t, \Delta t)$ is applied to all sequences X present at the node. Let $p_i$ be the proportion of examples belonging to class c, such that $f(x_k, t, \Delta t) \geqq \tau$ where $\tau$ is a threshold.

c) As in standard decision trees, threshold $\tau$ is searched so that it optimizes entropy S:

$$S = \sum_{i=1}^{N} -p_i \log_2(p_i)$$

d) Optimal parameters (t, $\Delta t$, $\tau$) with maximum entropy gain may be stored at that node and may be used while testing. When a node contains data from a single class, reaches a maximum depth or contains too few examples, the node may be considered as terminal, i.e. a leaf node 148.

e) Leaves of the TDT contain the posterior probabilities $p(y(X)=c)$.

Tree Weighting

Once the tree is trained, it may be evaluated on the entire training set to obtain a weight w for the tree (normalized across the entire forest).

Testing Temporal Random Forests

Let T be the number of trees. When a temporal sequence is to be classified, it may be tested against all the TDTs in the TRF as described below:

1) At each node, stored parameters (t, Δt, τ) are used to test a window from the sequence. The output is used to decide to which child the sequence has to be sent to next.

2) Once it reaches a leaf node 148, the class probabilities $p_i(y(X)=c)$ at leaf node 148 may be returned as the prediction for the sequence. The predicted value returned by each tree may then multiplied by their weight.

3) Class predictions ĉ for the TRF may then obtained by accounting for the output of all the individual trees:

$$\hat{c} = \underset{c}{\operatorname{argmax}} \sum_{i=1}^{T} w_i p_i(y(X) = c)$$

Figure 3:
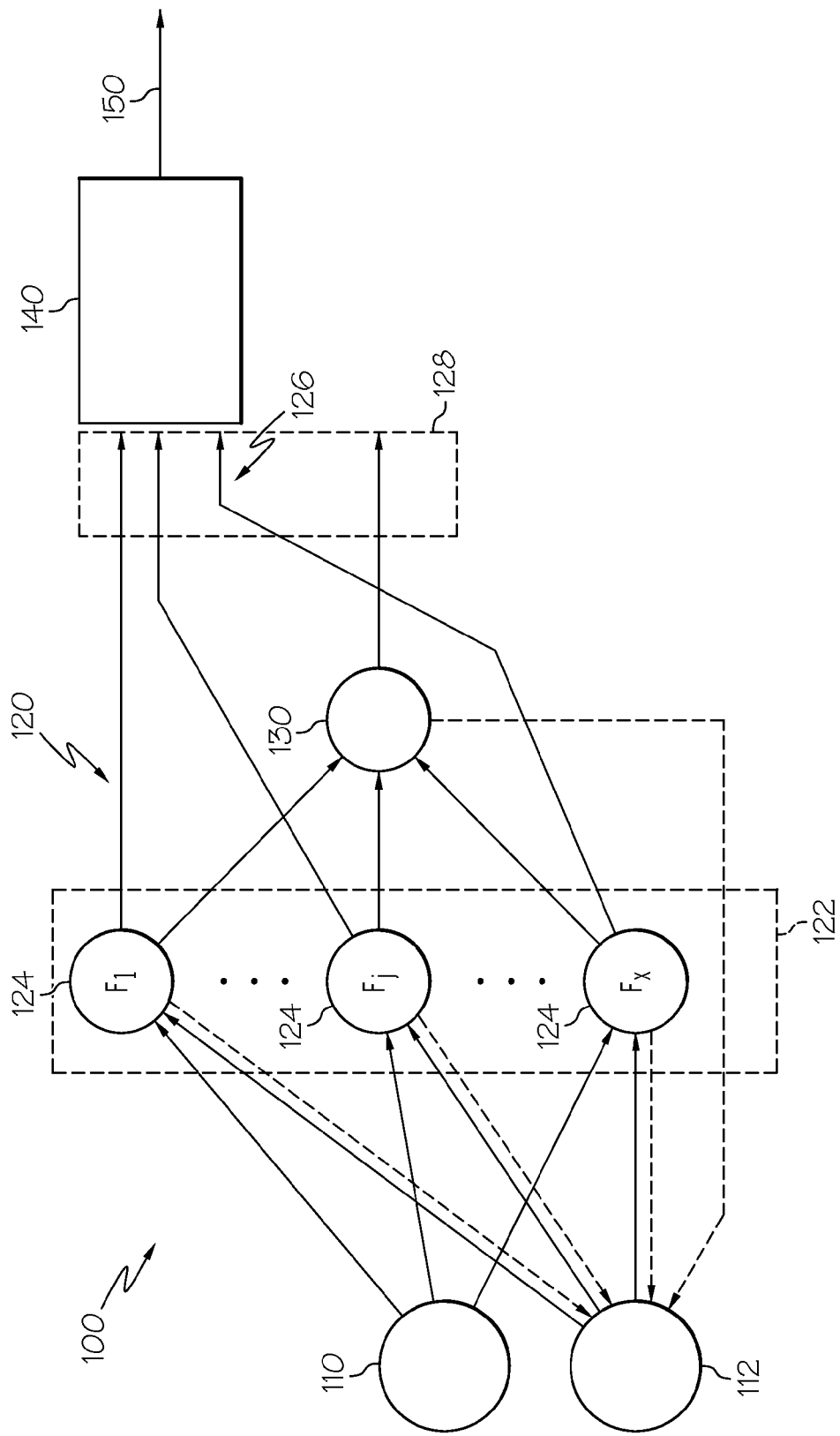
FIG. 3 schematically depicts a method for recognizing events according to one or more embodiments shown and described herein.

Having described RNN's, RF's and TRF's in detail, further embodiments may include recognizing events in a sequence of temporal signals by combining an output of a RNN with a RF and/or a TRF, each of the embodiments may be termed a recurrent random forest (RRF) and a recurrent temporal random forest (RTRF) respectively. According to one embodiment of a method 100 for recognizing events, depicted in FIG. 3, an event within a sequence of temporal signals is recognized by inputting the sequence of temporal signals into a RNN 120 coupled with an ensemble classifier 140. The RNN 120 comprises an input node 110, a recurrent input node 112, a layer of hidden nodes 122 and a neural output node 130. The structure of the RNN 120 is schematically depicted in FIG. 3 as a network structure, with single arrowed lines depicting the dependencies between nodes. For example, the neural output node 130 is dependent upon the input node 110, the recurrent input node 112, and the hidden layer of nodes 122. Furthermore, the dashed arrows (FIGS. 3 and 4) generally indicate an optional feedback path to the recurrent input node 112. Therefore, according to the embodiments described herein, the recurrent input node 112 may be dependent upon any of the hidden nodes 124 or the neural output node 130.

As depicted in FIG. 3, the hidden layer of nodes 122 comprises a plurality of hidden nodes 124. Each hidden node 124 performs an intermediate transformation with an activation function F, where the activation functions are generally indicated with F followed by a subscript j. The ellipses indicate that there may be any number of hidden nodes 124 in the layer of hidden nodes 122, i.e. from 1 to x hidden nodes 124. Typically, an RNN operates as a black box process executed by a processor, i.e., the RNN receives a data input and generates an output without revealing the outputs from the hidden nodes. Therefore, the hidden nodes 124 perform "hidden" intermediate transformations on data with the output of the intermediate transformations limited to use within the RNN.

In one embodiment, the hidden nodes 124 perform intermediate transformations on a sequence of temporal signals that are input into the input node 110. A feature vector 126 comprises output from the intermediate transformations of the multiple hidden nodes 124 and relates to an unrecognized event. The feature vector 126 operates to spread the sequence of temporal signals into several dimensions correlated with the number of hidden node outputs within the feature vector 126. For example, a sequence of temporal signals may be input into the input node 110 of the RNN 120. The dependency follows the arrows and a copy of the sequence of temporal signals may be input into each of the hidden nodes 124. The hidden nodes 124 perform a transformation on the temporal signals and the transformations are combined to form a feature vector 126. In another embodiment, feedback from the neural output node 130 may be input into a recurrent input node 112 of the RNN 120. Thus, the hidden nodes 124 may each perform a transformation on the temporal signals and the feedback from the neural output node 130. Therefore, the feature vector 126 can be dependent from both the instant input and from an output of a previous input (e.g., a 5 second old output of the RNN). It is noted that embodiments of the present disclosure may comprise an RNN of any order of complexity, and are not limited to the relative simple RNN's which are shown and described herein for descriptive purposes. For example, an RNN may have any number of layers, nodes, trainable parameters (also known as weights) and/or recurrences.

The feature vector 126 may be input into an ensemble classifier 140 such as, for example a RF or a TRF as described herein. The ensemble classifier 140 transforms the feature vector relating to the unrecognized event to a classification 150 of the unrecognized event, i.e. recognition of a recognized event. Therefore, the RNN may spread a sequence of temporal signals into many dimensions prior to being input into an RF and/or a TRF.

Figure 4:
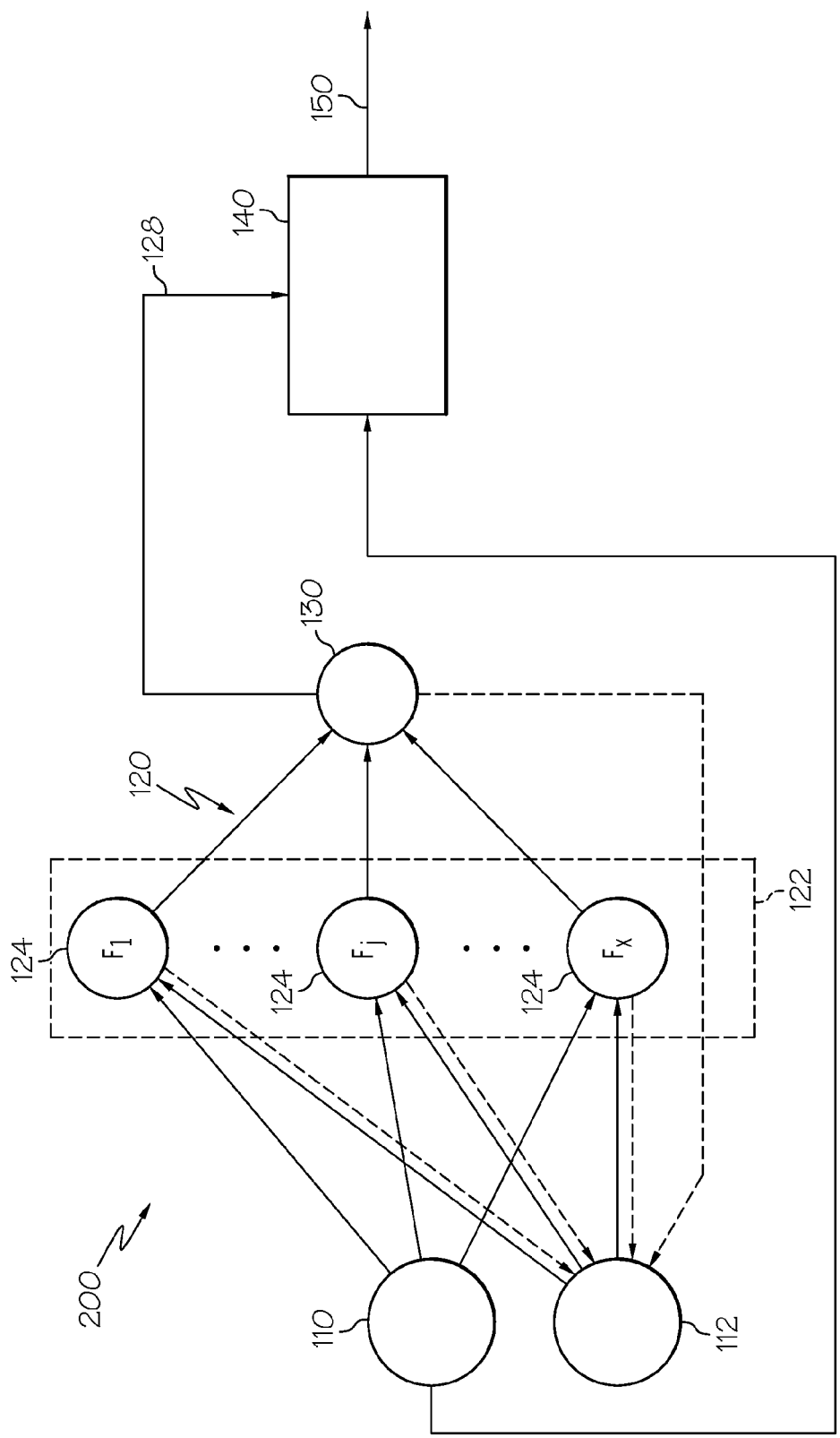
FIG. 4 schematically depicts a method for recognizing events according to one or more embodiments shown and described herein.

According to the embodiments described herein, the RNN may also be used in an alternative combination with a TRF to recognize events in a sequence of temporal signals. Referring now to FIG. 4 a method 200 for recognizing events is schematically depicted. The method 200 generally comprises inputting a sequence of temporal signals relating to an unrecognized event to an input node 110 of a recurrent neural network 120. The neural output 128 and sequence of temporal signals may be input into an ensemble classifier 140. The unrecognized event may then be recognized by the ensemble classifier 140 based upon the sequence of temporal signals and on the neural output 128.

Figure 5:
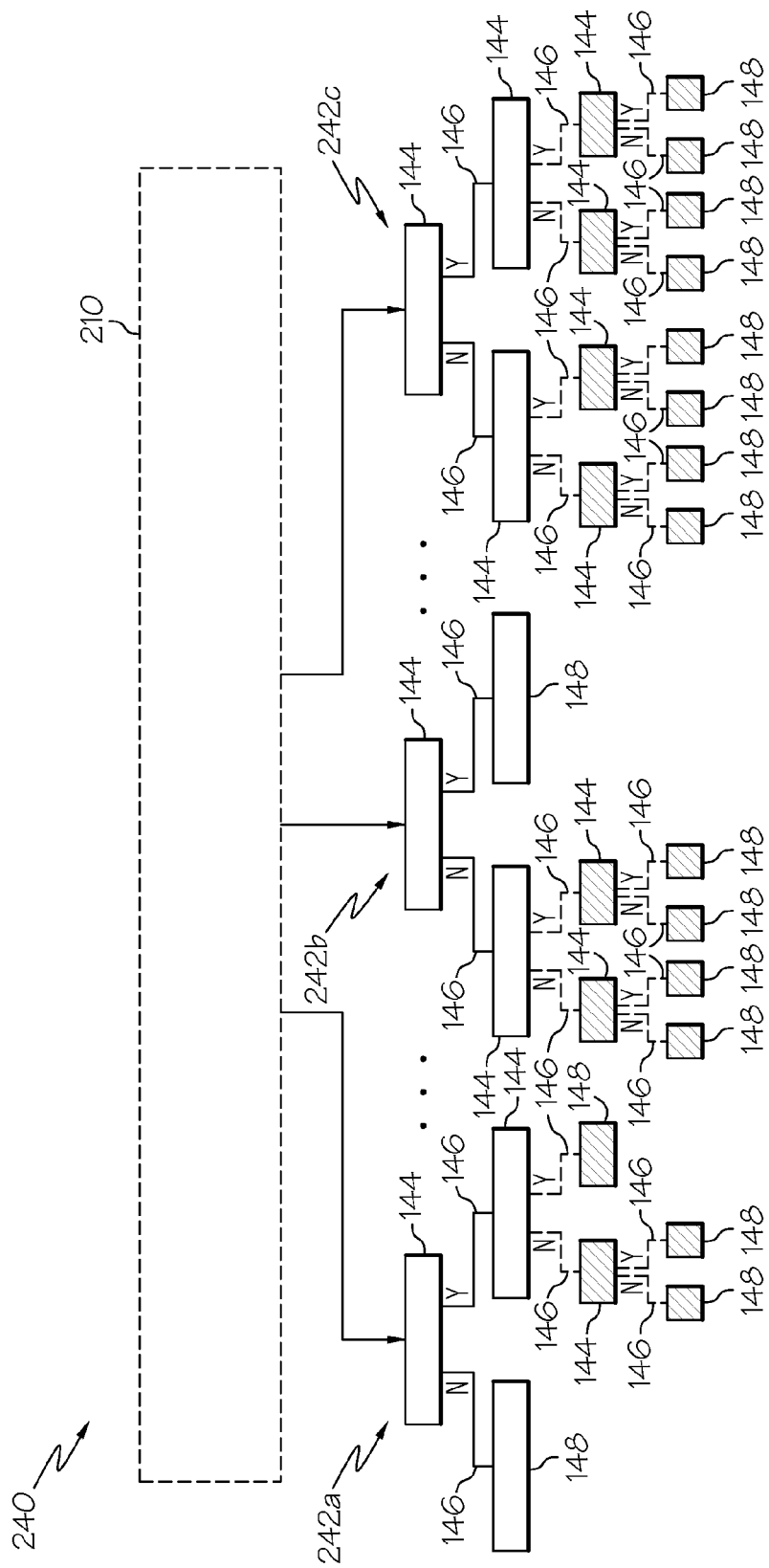
FIG. 5 schematically depicts a temporal random forest according to one or more embodiments shown and described herein.

Referring collectively to FIGS. 2A and 5, the ensemble classifier 140 may comprise a group of classifiers. Specifically, in one embodiment, the ensemble classifier 140 may be a RF 240 comprising a group of TDT's. Each of the TDT's comprises decision nodes 144 for making determinations, decision paths 146 that interconnect the decision nodes 144, and filtering functions that transform the data at the decision nodes 144 prior to selecting a decision path 146. Each of the TDT's terminate at a plurality of leaf nodes 148. The leaf nodes 148 represent the possible recognitions for the given TDT, e.g., the first TDT 242a comprises four leaf nodes 148, the second TDT 242b comprises five leaf nodes 148, and the third TDT 242c comprises eight leaf nodes. When a temporal sequence is input into the ensemble input 210, each of the individual TDT's recognize the sequence at a leaf node 148 as sub-recognition events. The RF 240 collects the sub-recognition events to recognize a recognized event for input sequence of temporal signals, as described herein.

Referring again to FIG. 2A, in one embodiment all or some of the node filters if in the TRF may be replaced with an RNN. Each RNN may implement a desired function $f_{RNN}''(x_1(t), W'')$ on a decision nodes input(s) $x_1(t)=\{x_{i1}(t), x_{i2}(t), \ldots, x_{it}(t)\}$. The RNN weights $W''$ may be trained in advance (prior to the TRF training) or may be initialized with its weights $W''$ fixed during the TRF training. The desired RNN function $f_{RNN}''(x_1(t), W'')$ is represented by $$z(t)=h(z(t-1),x_1(t),W_1'')$$

$$o(t)=g(Z(t),W_2'')$$

where vector-function h is the first hidden layer of the RNN with its state vector t. In another embodiment, all or some of the filtering functions of the TRF may be selected from a function library comprising a discrete list of mathematic or logical functions with a randomizer.

In the embodiments described herein the RNN may be trained using an optimizer, an unsupervised learning algorithm, an evolutionary algorithm, and the like. In one embodiment, the RNN may be trained to differentiate events from a sequence of temporal signals relating to the unrecognized events before assigning the recurrent neural network to one of the decision nodes. In another embodiment, the RNN may be trained based at least in part upon at least one of the group of sub-recognition events, i.e., the sub-recognition events may be utilized during training as a parameter to be optimized while modifying the structure of the RNN. In a further embodiment, the RNN is untrained and may comprise an arbitrary structure. Furthermore, it is noted that the ensemble classifiers described herein may be trained in a manner analogous to the RNN by using an optimizer, an unsupervised learning algorithm, an evolutionary algorithm, and the like It should now be understood that the embodiments described herein relate to systems and methods for event recognition. In one embodiment, the processor may be disposed within a vehicle and the temporal sensor may be configured to detect a driver interaction with the vehicle. For example, the system may comprise a camera and be configured to recognize a sleeping driver. The sequence of temporal signals may be a sequence of images sampled over time that are input into a RNN executed by the processor. The output of the RNN may be input into a TRF that has been trained to recognize a sleep event, as described herein. Once the TRF has determined that the sequence of images is indicative of a sleep event, e.g., by meeting preset criteria such, or majority voting among TDT's, an alarm signal such as, for example, an audible sound, flash of light, or a blast of cold air may be output to wake the driver. While, specific embodiments relating to sleep recognition have been described herein, it is noted that the event recognizers described herein are general in nature and suitable to recognize any event within any temporal signal.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for recognizing events comprising:
a processor for executing machine readable instructions, wherein the processor is electronically coupled to an electronic memory;
a temporal sensor electronically coupled to the processor for generating a sequence of temporal signals relating to an unrecognized event, wherein the temporal sensor transmits the sequence of temporal signals to the processor and the processor executes the machine readable instructions to:
input the sequence of temporal signals relating to the unrecognized event to a recurrent neural network;
transform the sequence of temporal signals relating to the unrecognized event to a neural output relating to the unrecognized event with the recurrent neural network;
input the neural output relating to the unrecognized event into a random forest classifier; and
recognize a recognized event based upon a transformation of the neural output relating to the unrecognized event with the random forest classifier.

2. The system for recognizing events of claim 1 further comprising a vehicle, wherein the processor is disposed within the vehicle and the temporal sensor detects a driver interaction with the vehicle.

3. The system for recognizing events of claim 1 wherein the neural output is a feature vector representing a plurality of intermediate transformations of the sequence of temporal signals relating to the unrecognized event from a hidden layer of nodes of the recurrent neural network.

4. The system for recognizing events of claim 1 wherein a decision path of the random forest classifier is followed based upon the neural output relating to the unrecognized event.

5. A method for recognizing events, wherein a temporal sequence of electronic data is transformed by a processor into a sequence recognition, the method comprising:
inputting a sequence of temporal signals relating to an unrecognized event into a feedback system, wherein the feedback system comprises a hidden layer of nodes for performing intermediate transformations;
generating a feature vector relating to the unrecognized event from the sequence of temporal signals with the hidden layer of nodes, the feature vector representing a plurality of intermediate transformations of the sequence of temporal signals;
inputting the feature vector into an ensemble classifier for the sequence recognition, wherein the ensemble classifier is a random forest comprising decision trees;
providing a training sequence wherein an unrecognized training event is correlated to a recognized training event;
sampling a sampled sequence for each of the decision trees from the training sequence, wherein the training sequence and the sampled sequence have an equal amount of data points such that some of the training sequence is duplicated in the sampled sequence and some of the training sequence is omitted from the sampled sequence;
recognizing a recognized event based upon a plurality of classifying transformations performed by the ensemble classifier upon the feature vector relating to the unrecognized event; and
providing output relating to the recognized event.

6. The method of claim 5 further comprising assigning a mathematic function that performs an intermediate transformation at a node of the hidden layer of nodes.

7. The method of claim 6 wherein the mathematic function that performs the intermediate transformation is selected from a function library according to a probability distribution function.

8. The method of claim 5 wherein each of the decision trees comprises decision nodes and decision paths, such that one of the decision paths interconnects a pair of the decision nodes, further comprising:

sampling a subset from the sampled sequence for each of the decision nodes; and training one of the decision paths at each of the nodes with the subset of the sampled sequence.

9. The method of claim 5 wherein the sequence of temporal signals comprises multi-dimensional signals sampled over time.

10. The method of claim 5 wherein the recognized event is sleep.

11. The method of claim 10 wherein the output is an alarm when the sleep meets a preset criteria.

12. A method for recognizing events, wherein a temporal sequence of electronic data is transformed by a processor into a sequence recognition, the method comprising:

inputting a sequence of temporal signals relating to an unrecognized event into a group of classifiers, wherein each of the group of classifiers comprises decision nodes for making determinations based upon the sequence of temporal signals, decision paths that interconnect the decision nodes, and filtering functions that transform the sequence of temporal signals;

assigning the filtering functions to each of the decision nodes, wherein one of the decision nodes is assigned a recurrent neural network;

transforming the sequence of temporal signals relating to the unrecognized event at the decision nodes to a windowed sequence relating to the unrecognized event;

following each of the decision paths based at least in part upon a transformation of the windowed sequence by the filtering functions;

generating a group of sub-recognition events by following the decision paths of the group of classifiers until they terminate; and recognizing a recognized event based upon the group of sub-recognition events, wherein the recognized event is recognized based upon majority voting of the group of sub-recognition events.

13. The method of claim 12 further comprising training the recurrent neural network to recognize the recognized event from the sequence of temporal signals relating to the unrecognized event before assigning the recurrent neural network to one of the decision nodes of the group of classifiers.

14. The method of claim 12 further comprising training the recurrent neural network to recognize the recognized event from the sequence of temporal signals relating to the unrecognized event after assigning the recurrent neural network to one of the decision nodes.

15. The method of claim 14 wherein the recurrent neural network is trained based at least in part upon at least one of the group of sub-recognition events with an unsupervised learning algorithm or an evolutionary algorithm.

16. The method of claim 12 further comprising selecting one of the filtering functions from a function library with a randomizer.

17. The method of claim 16 wherein the randomizer selects one of the filtering functions according to a probability distribution function.

18. The method of claim 12 wherein the recurrent neural network is untrained.

* * * * *